(12) United States Patent
Keegan et al.

(10) Patent No.: US 7,709,737 B2
(45) Date of Patent: May 4, 2010

(54) ADHESIVE-LESS DC BUS SYSTEM AND METHOD FOR MANUFACTURING

(75) Inventors: Jeremy J Keegan, Kewaskum, WI (US);
Scott D. Day, Richfield, WI (US);
William K. Siebert, West Bend, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 887 days.

(21) Appl. No.: 11/460,399

(22) Filed: Jul. 27, 2006

(65) Prior Publication Data

US 2008/0024959 A1 Jan. 31, 2008

(51) Int. Cl.
*H02G 5/00* (2006.01)
*H02B 1/20* (2006.01)

(52) U.S. Cl. ............... 174/72 B; 174/520; 174/71 B; 174/88 B; 361/611; 361/624; 361/637

(58) Field of Classification Search .......... 174/50, 174/520, 559, 566, 561, 562, 72 B, 71 B, 174/88 B, 70 B, 99 B, 40 CC, 68.2, 560; 361/611, 624, 637, 639, 648, 807, 809, 825; 439/82, 620, 845, 620.01; 24/335, 336, 338, 24/340; 29/525, 592, 592.1
See application file for complete search history.

(56) References Cited

U.S. PATENT DOCUMENTS

| | | | | |
|---|---|---|---|---|
| 3,504,100 A | * | 3/1970 | Ohshima et al. | 174/88 B |
| 4,133,101 A | * | 1/1979 | Glover | 29/525 |
| 4,886,468 A | * | 12/1989 | Harton et al. | 174/68.2 |
| 5,364,203 A | * | 11/1994 | Ishikawa | 174/71 B |
| 6,325,640 B1 | * | 12/2001 | Kasai | 174/71 B |
| 6,479,751 B1 | * | 11/2002 | Bisson et al. | 174/70 B |

* cited by examiner

*Primary Examiner*—Angel R Estrada
(74) *Attorney, Agent, or Firm*—Quarles & Brady LLP; Alexander R. Kuszewski; John M. Miller (57) ABSTRACT

A system and method for manufacturing a power bus assembly is provided. The power bus assembly includes a first conductive sheet configured to receive a positive charge and distribute the positive charge to a plurality of connection points formed thereon. The power bus assembly also includes a second conductive sheet configured to receive a negative charge and distribute the negative charge to a plurality of connection points formed thereon. Additionally, the power bus assembly includes an insulating sheet arranged between the first conductive sheet and the second conductive sheet to electrically isolate the first conductive sheet from the second conductive sheet. A plurality of vice fasteners are included to secure the first conductive sheet, the second conductive sheet, and the insulating sheet together to form the power bus assembly.

24 Claims, 5 Drawing Sheets

ADHESIVE-LESS DC BUS SYSTEM AND METHOD FOR MANUFACTURING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to power bus systems and, more particularly, to a bus assembly for DC bus links used in motor drive units and the like that can be assembled using a plurality of clamping fasteners. The clamping fasteners are designed to secure the multiple layers of the DC bus together without the need for adhesives.

Often, power delivered from a power source or supply is not properly conditioned for consumption. For example, power plants are linked to power consuming facilities (e.g., buildings, factories, etc.) via utility grids that are designed to be extremely efficient at delivering massive amounts of power. To facilitate efficient distribution, power is delivered over long distances as fixed frequency three-phase alternating current (AC) power. Similarly, in modern vehicle systems, especially hybrid vehicle systems, power management and storage systems handle power in various forms, such as those that are desirable for storage and those that are desirable for consumption. In either case, the power must typically be converted or "conditioned" prior to consumption.

For example, motors and their associated loads are one type of common inductive load employed at many consuming facilities that require power conditioning. When a motor is the consuming point, power "conditioning" systems are utilized to convert the fixed frequency AC power delivered over utility grids to a form suitable for driving the motor. To this end, power conditioning for motor systems typically include AC-to-DC (direct current) rectifiers that convert the utility AC power to DC power applied to positive and negative DC buses (i.e. across a DC link). The power distributed across the DC buses is then converted, for example by use of an inverter, to AC power designed to drive the motor.

Though the above-described system was described with respect to power conditioning for motor systems, such DC bus systems are utilized in a wide range of systems and applications. That is, regardless of the particulars of the consuming components or ultimate application within which the DC bus is employed, DC bus assemblies are often utilized to distribute DC power across various components for reconditioning, storage, and/or consumption.

To create a DC bus assembly, a variety of laminates or adhesively bound components are utilized. For example, a first sheet of copper or similar conductor is arranged as the negative bus line. A second sheet of copper or other conductor is then arranged over the negative bus line and separated by an insulator to serve as the positive bus line. Additional layers that are separated by insulation layers may then be arranged over or between the positive and negative bus layers.

In most applications, the DC bus assembly must be structurally sound so that various components can be securely mounted to the DC bus assembly. That is, each layer in the DC bus assembly must be joined to form a composite structure capable of at least partially supporting components mounted to the assembly. Furthermore, the DC bus assembly must meet various environmental and operational tolerances, such as vibration and heat tolerances. For example, in the above-described example of a motor drive system, typically, the DC bus must have sufficient structural integrity to support both the rectifier and the inverter, as well as various additional components, such as capacitors, water cooling systems, and the like. Furthermore, the DC bus must be able to sustain its structural integrity when subjected to vibrations and high temperatures often associated with motor systems.

To create a DC bus assembly that is suitable for the desired application (i.e. has suitable structural integrity and meets the vibration and temperature constraints), the layers (conductors and insulators) are typically bonded together using adhesives. That is, each conductive layer is bonded to each adjacent insulating layer, such that the assembly is formed by alternating layers of conductor and insulator that are all bonded through adhesives. These laminated DC bus structures provide noise cancellation properties and have become commonplace in power conversion equipment.

While such manufacturing methods have long been employed to great success with meeting the structural requirements needed to withstand vibrations and temperature changes associated with a wide variety of environments, they are rather costly. In particular, the process of aligning and gluing the individual layers requires a high degree of skill because the manufacturer must carefully align the adjacent layers to ensure that adjacent conductors; will not be in contact and will not later move into contact when the separating insulator is subjected to heat and vibration.

As such, the cost of more complex bus structures is often prohibitive. For example, a "3D" bus structure, where the bus sheets are bent to extend into multiple planes, is often cost prohibitive because the process of correctly aligning and gluing adjacent layers simultaneously across multiple planes is extremely difficult, if not impossible. Therefore, though such a 3D bus structure could be advantageously utilized in a wide variety of systems since it would permit the size and shape of the bus to be more compact and/or adapted to fit into non-traditional environments, it is generally foregone in favor of the traditional flat or planar bus design due to cost and quality control constraints.

Therefore, it would be desirable to have a system and method for creating Et power bus assembly that reduces manufacturing costs and complexities, is more adaptable to various bus designs, and provides increased structural integrity.

BRIEF SUMMARY OF THE INVENTION

The present invention overcomes the aforementioned drawbacks by providing a system and method for creating a power bus that utilizes a plurality of clamping fasteners designed to secure the multiple layers of the power bus together without the need for adhesives.

In accordance with one aspect of the present invention, a power bus assembly is disclosed that includes a first conductive sheet configured to receive a positive charge and distribute the positive charge to a plurality of connection points formed thereon. The power bus assembly also includes a second conductive sheet configured to receive a negative charge and distribute the negative charge to a plurality of connection points formed thereon. Additionally, the power bus assembly includes an insulating sheet arranged between the first conductive sheet and the second conductive sheet to electrically isolate the first conductive sheet from the second conductive sheet. A plurality of vice fasteners are included to secure the first conductive sheet, the second conductive sheet, and the insulating sheet together to form the power bus assembly.

In accordance with another aspect of the present invention, a power bus assembly is disclosed that includes a first conductive sheet having a plurality of connection points and a plurality of through holes formed therein. The first conductive sheet is configured to receive a positive charge and distribute the positive charge to the plurality of connection points. The power bus assembly also includes a second conductive sheet having a plurality of connection points and a plurality of through holes formed therein. The second conductive sheet is configured to receive a negative charge and distribute the negative charge to the plurality of connection points. An insulating sheet is arranged between the first conductive sheet and the second conductive sheet to electrically isolate the first conductive sheet from the second conductive sheet. The insulating sheet also has a plurality of through holes arranged therein that are designed to align with the through holes formed in the first conductive sheet and the second conductive sheet to form a plurality of through hole sets that extend through the first conductive sheet, the second conductive sheet, and the insulating sheet. Additionally, the power bus assembly includes a plurality of coupling fasteners. Each coupling fastener is aligned to extend through a through hole set and secure the first conductive sheet, the second conductive sheet, and the insulating sheet together to form the power bus assembly.

In accordance with yet another aspect of the invention, a method of manufacturing a power bus assembly is disclosed that includes forming a first conductive sheet configured to receive a positive charge and distribute the positive charge to a plurality of connection points arranged thereon. The method also includes forming a second conductive sheet configured to receive a negative charge and distribute the negative charge to a plurality of connection points arranged thereon. Also, the method includes forming an insulating sheet having a perimeter substantially matched to perimeters of the first conductive sheet and the second conductive sheet and cutting a plurality of through holes in the first conductive sheet, the second conductive sheet, and the insulating sheet. The method further includes arranging the insulating sheet between the first conductive sheet and the second conductive sheet to form a power bus assembly with the through holes formed in the first conductive sheet, the second conductive sheet, and the insulating sheet aligned to form a plurality of passages through the power bus assembly. Furthermore, the method includes affixing a clamping fastener within each of the plurality of passages to secure the first conductive sheet, the second conductive sheet, and the insulating sheet together in the power bus assembly.

In accordance with still another aspect of the invention, a clamping fastener for creating an adhesive-less power bus assembly is disclosed that includes a first clamping plate configured to be arranged within a through hole formed in a power bus assembly and a flange axially offset from the first clamping plate and extending radially from the first clamping plate to extend over a portion of a first side of the power bus assembly. The clamping fastener also includes a second clamping plate configured to be arranged within the through hole in the power bus assembly and a flange axially offset from the second clamping plate and extending radially from the second clamping plate to extend over a portion of a second side of the power bus assembly arranged opposite the first side of the power bus assembly. A hub extends from the second clamping plate toward the first clamping plate through the through hole in the power bus assembly and a connector extends through the hub to engage the first clamping plate and the second clamping plate and compress the first side and the second side of the power bus assembly together.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

While the following description is directed a motor drive system 10, it is contemplated that the following power bus system can be used with a wide variety of associated systems. For example, it is contemplated that the power bus may be used with vehicular power systems, such as hybrid vehicle systems.

Figure 1:
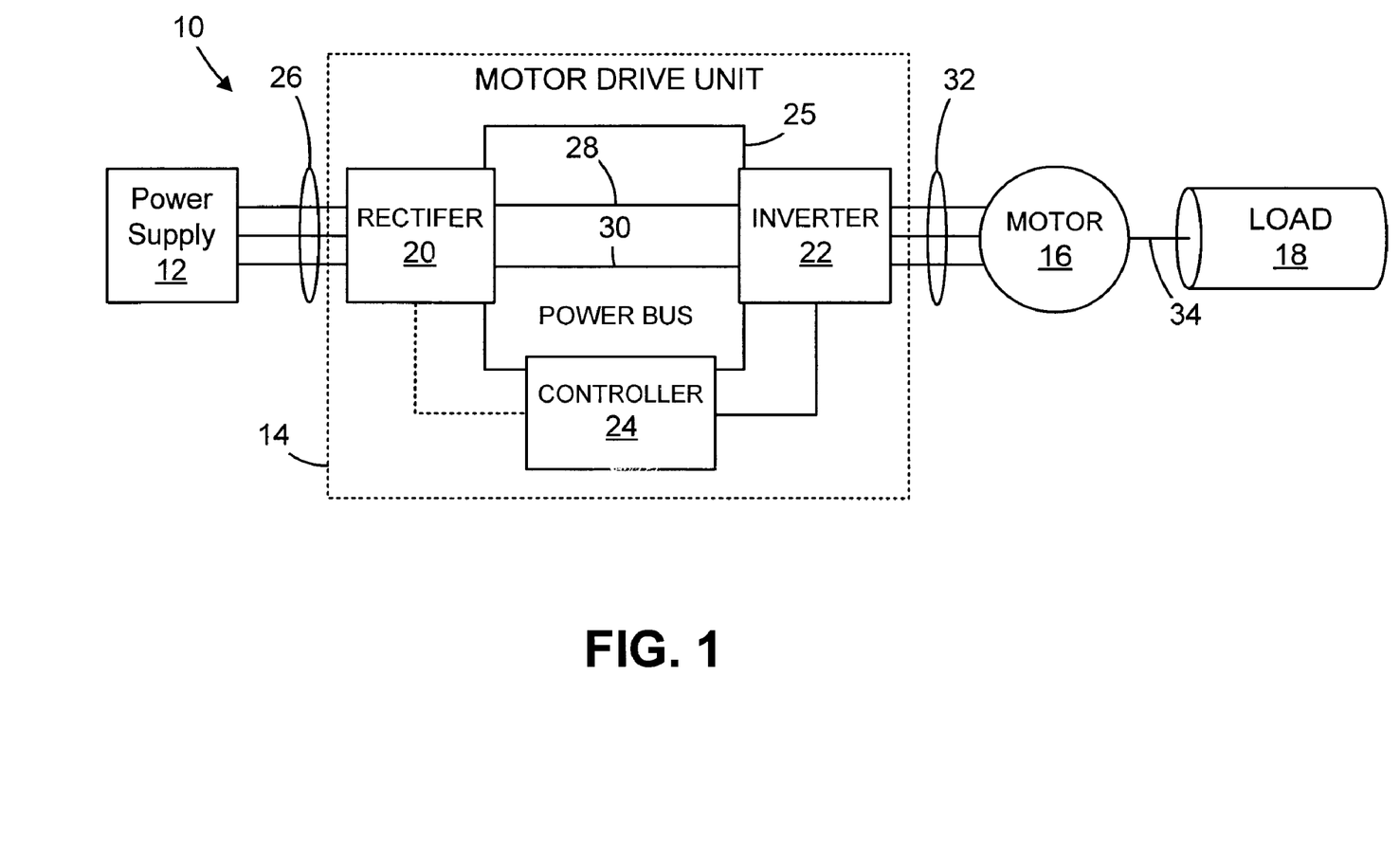
FIG. 1 is a schematic representation of a motor system including a power conditioning device in accordance with the present invention.

Referring now to FIG. 1, the present invention can be described in the context of a motor control system 10. The motor control system 10 includes a power supply 12 and a motor drive unit 14. The power supply 12 provides power to the motor drive unit 14 that, in turn, converts the power to a more usable form for a three-phase motor 16 that drives an associated load 18.

The motor drive unit 14 includes a variety of components, such as a rectifier 20, an inverter 22, and a controller 24, each of which are connected to a power bus 25. During operation, the power supply 12 provides three-phase AC power, for example, as received from a utility grid over transmission power lines 26. However, it is also contemplated that the power supply 12 may be designed to deliver single-phase power. In either case, the nominal line voltage delivered by the power supply 12 is dependent on the particulars of the motor 16, load 18, and power available to the power supply 12 to drive the motor drive 14. For example, the power supply 12 may be a transmission power receptacle, in which case, the power available to the motor control system 10 will be dependent upon the specifics of the geographic region in which the motor control system 10 is located (e.g. 50 Hz/60 Hz or 220 V/380V).

Accordingly, the rectifier 20 is designed to receive AC power from the power supply 12 and convert the AC power to DC power that is delivered to the power bus 25. Continuing with the example of a motor drive system 10, the inverter 22 is positioned between positive and negative DC buses 28, 30 of the power bus 25. As is well known in the motor control arts, the inverter 22 includes a plurality of switching devices (e.g., BJTs and the like) that are positioned between the positive and negative buses 28, 30 of the power bus 25 and output supply lines 32 of the inverter 22, such that the controller 24 can open and close specific combinations of the switches to sequentially generate positive and negative DC voltage pulses on each of the supply lines 32. By opening and closing the switches of the inverter 22 in specific sequences, the motor drive unit 14 generates AC power having controllable amplitudes and frequencies on each of the supply lines 32. By providing known sequences of AC power across the motor windings, the motor 16 is driven to turn a drive shaft 34 that, in turn, drives the load 18.

Figure 2:
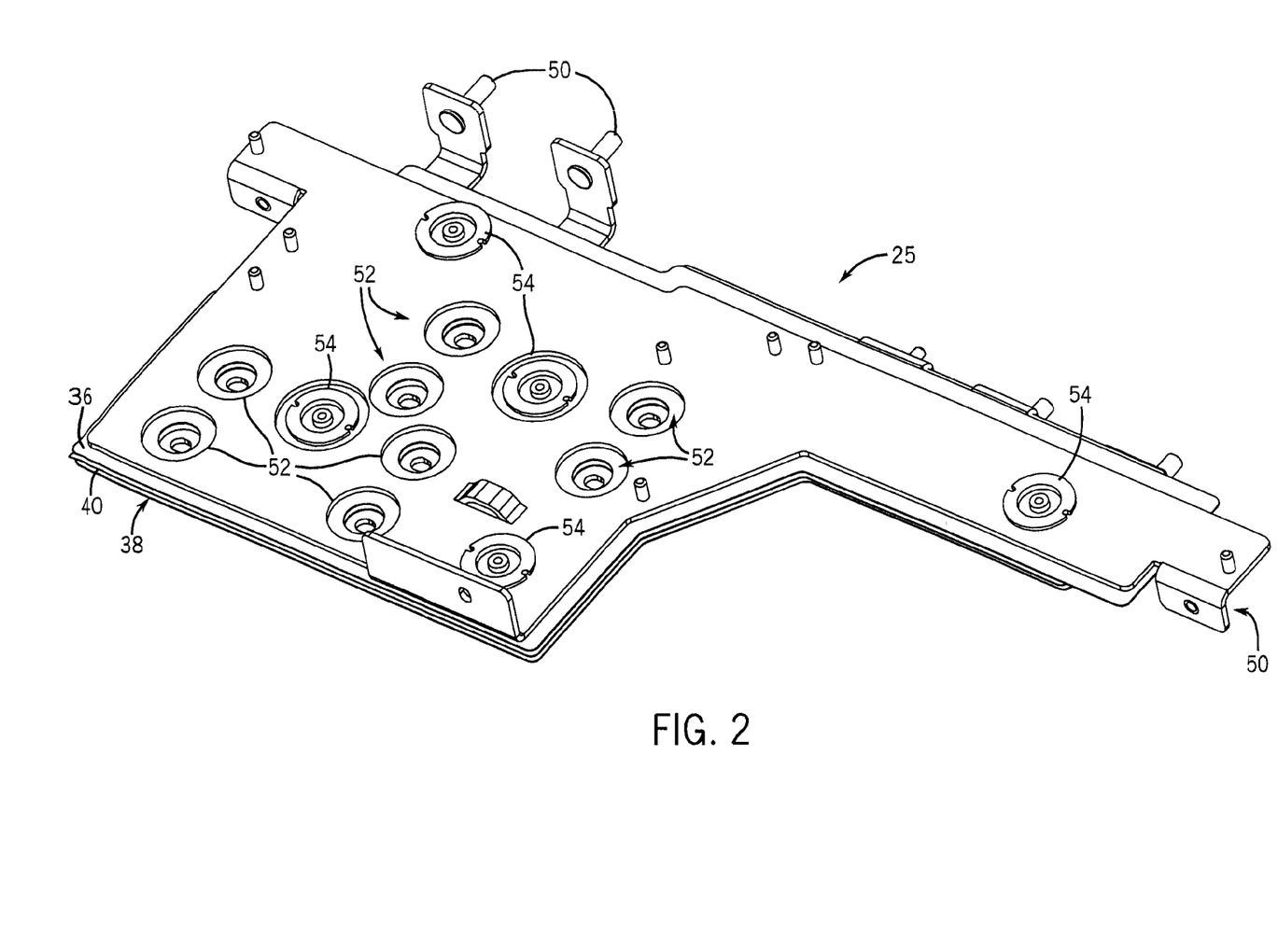
FIG. 2 is a perspective view of a power bus arranged in a planar configuration assembled using clamping fasteners in accordance with the present invention.
Figure 3:
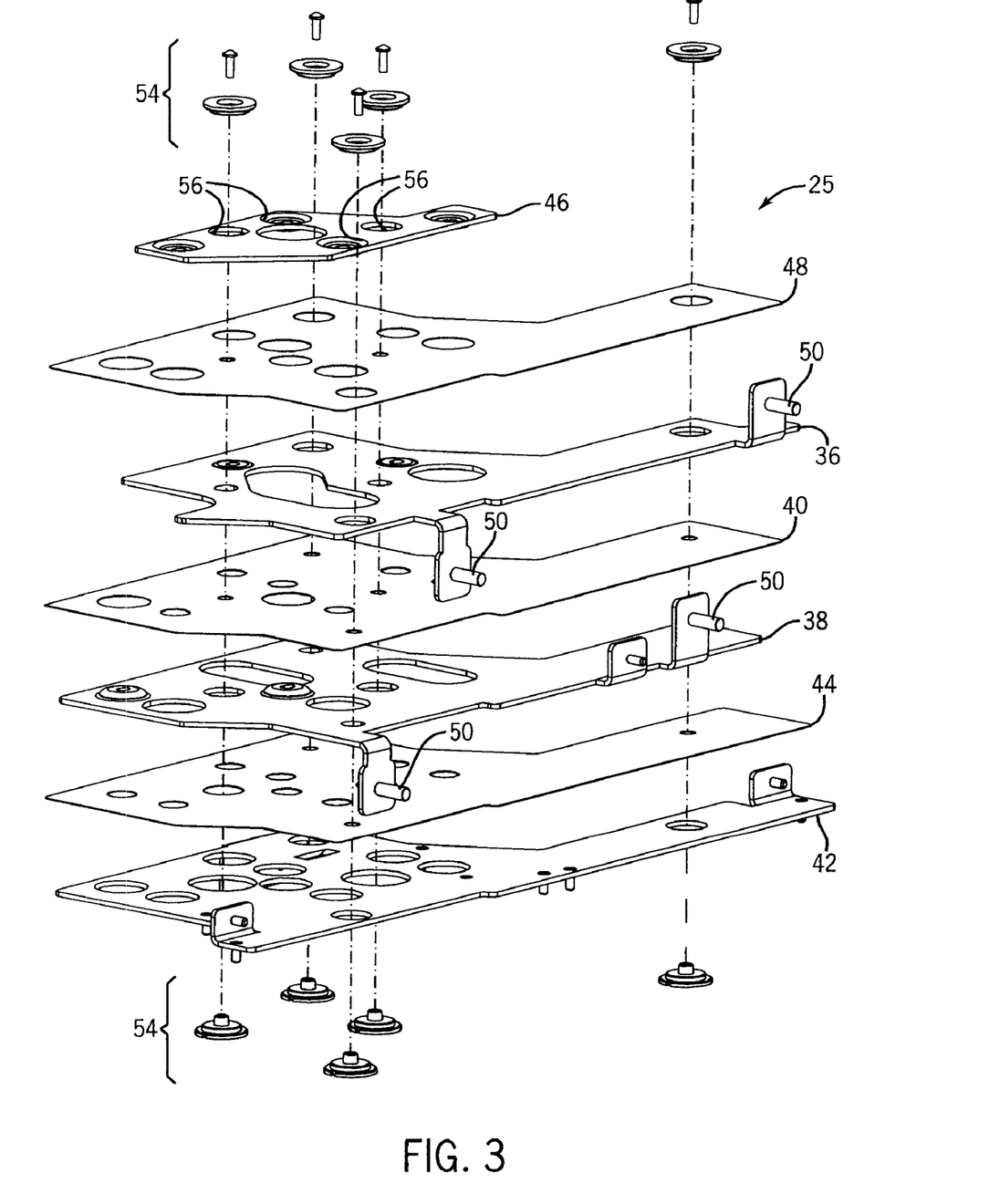
FIG. 3 is an exploded view of the power bus of FIG. 2.

Referring now to FIGS. 2 and 3, one arrangement for the power bus 25 is shown in detail. In particular, the power bus 25 is arranged in a planar bus structure. The power bus 25 is a multi-layer structure that includes at least a first conductive sheet 36, for example, designed to carry a positive charge and a second conductive sheet 38, for example, designed to carry a negative charge. Separating the first conductive sheet 36 and the second conductive sheet 38 is an insulating sheet 40.

In addition to the conductive sheets 36, 38 and the insulating sheet 40, a cover sheet 42 may be included that is separated from adjacent conductors 36, 38 by an associated insulating sheet 44. Additionally, the cover sheet 42 may be designed to be grounded so as to form an electromagnetic shield over the power bus 25. Finally, it is contemplated that one or more serial connection layers 46 may be included that provide connection points to non-adjacent conductor layers and that are separated from adjacent conductive layers by an associated insulating layer 48.

When these layers 40-48 are arranged together, the power bus 25 presents a plurality of connection points for delivering or receiving power from the power bus 25. For example, connection points may be provided such as studs 50 or receptacles 52. In this regard, the studs 50 may be used as connection points for large devices, such as the rectifier 20 and inverter 22 of FIG. 1. On the other hand, the receptacles 52 may be used as connection points for other devices, such as filtering capacitors in the case of a motor drive (FIG. 1) or storage capacitors in the case of other systems, such as hybrid vehicle systems.

In any case, the cover sheet 42 may be included to fortify the structural integrity of the assembled power bus 25. Accordingly, the power bus 25 can be designed to support an increased percentage of the weight of a device mounted thereto, such as a rectifier or inverter. Furthermore, the cover sheet 42 may be designed to increase the structural integrity of the power bus 25 so that it is capable of supporting devices or withstanding influences that would otherwise damage the power bus 25.

To secure the layers 40-48 together and within the proper alignments, a plurality of clamping fasteners 54 are included. In particular, the clamping fasteners 54 are designed to be positioned within holes 56 formed in each layer 40-48 that form coaxially aligned passages through the power bus 25 when the layers 40-48 are properly assembled.

Figure 4:
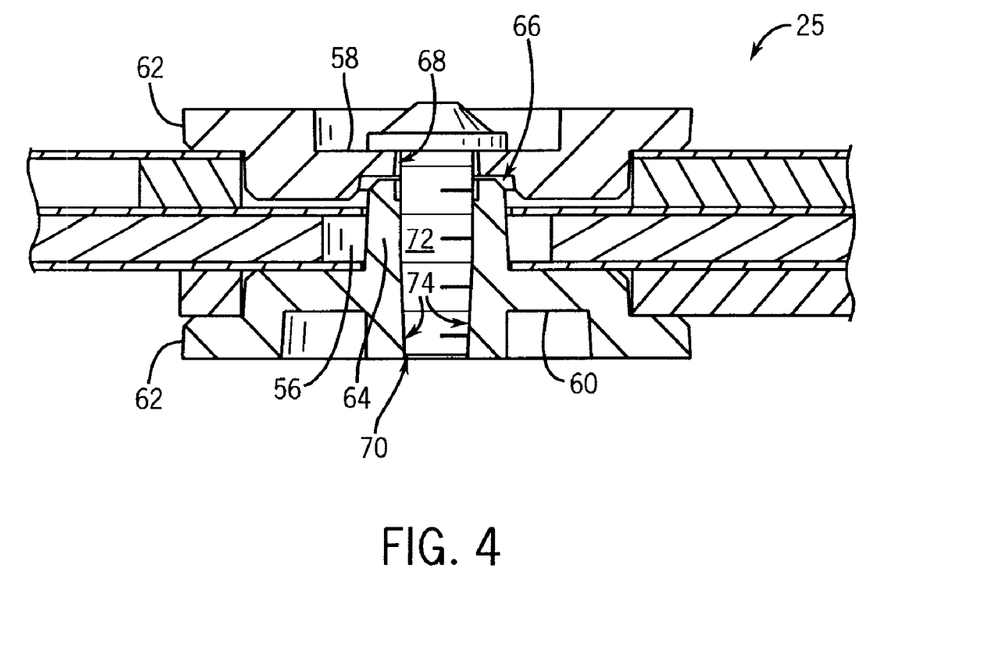
FIG. 4 is a cross-sectional view of a clamping fastener engaged with the power bus of FIG. 2.
Figure 5:
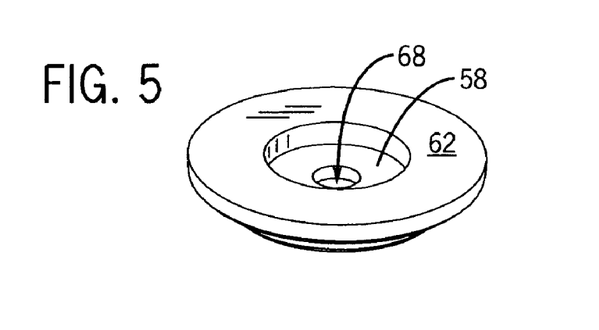
FIG. 5 is a perspective view of a first clamping plate of the clamping fastener included in FIGS. 2-4.
Figure 6:
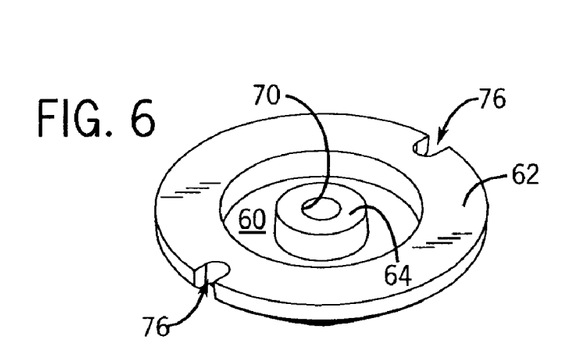
FIG. 6 is a plan view of a second clamping plate of the clamping fastener included in FIGS. 2-4.

Referring now to FIGS. 4-6, the clamping fasteners 54 include a first clamping plate 58 and a second clamping plate 60. Each clamping plate 56, 60 includes a flange 62 axially offset from each clamping plate 58, 60 and extending radially from each clamping plate 58, 60 to extend over a portion of the power bus assembly 25.

A hub 64 extends from the second clamping plate 60 toward the first clamping plate 58 through the through hole 56 in the power bus assembly 25. An annular notch 66 formed opposite the flange receives an end of the hub 54 opposite the second clamping plate 60 to restrict movement of the first clamping plate 58 with respect to the second clamping plate 60.

The clamping plates 58, 60 include holes 68, 70 that are designed to be aligned coaxially with the holes 56 in the power bus 25. Accordingly, a passage is formed through the first clamping plate 58, the hub 64, and the second clamping plate 60. A connector, in the form of a threaded screw 72, is designed to pass through the hole 68 in the first clamping plate 58 to engage the hub 64. It is contemplated that the hub 64 includes a narrowed interior periphery 74 (i.e., having a reduced diameter) that is engaged by the screw 72. Accordingly, when the screw 72 is passed through the hole 68 in the first clamping plate 58 to engage the hub 64, the threads of the screw 72 engage the narrowed interior periphery 74 of the hub 64. For example, it is contemplated that the screw 72 may be a Plastite screw. Plastite is a registered trademark of Research Engineering & Manufacturing, Inc. Corporation of New Bedford, Mass.

In any case, the screw 72 is designed to pull the first clamping plate 58 toward the second clamping plate 60 as the screw 72 is tightened to secure the layers 40-48 of the power bus 25 together without the need for adhesives, glues, or the like. Furthermore, the engagement of the screw 72 with the narrowed interior periphery 74 of the hub 64 is designed to secure the screw 72 against the potential for the screw 72 to loosening due to vibrations that may be experienced during operation. To aid in the process of threading the screw 72 through the hub 64 and into the second clamping plate 60, as shown in FIG. 6, it is contemplated that the flange 62 extending from the second clamping plate 60 may include notches designed to aid in fixing the position of the second clamping plate 60 (i.e., hold against rotation) as the screw 72 is threaded through the passage 70. Also, as illustrated in FIG. 6, it is contemplated that the hub 64 may extend beyond the second clamping plate toward the flange 62 to provide an additional extent through which the screw 72 can extend.

Additionally, it is preferable that at least the first clamping plate 58, the second clamping plate 60, and the hub 64 are formed of a non-conductive material. In accordance with one aspect of the invention, it is contemplated that the first clamping plate 58, the second clamping plate 60, and the hub 64 may be formed of a variety of plastic, rubber, or other non-conductive materials. For example, in accordance with one embodiment, the clamping fasteners 54 (with the exception of the screw) may be formed of Mindel B-430. Mindel is a registered trademark of Union Carbide Corporation New York of Danbury Conn.

Figure 7:
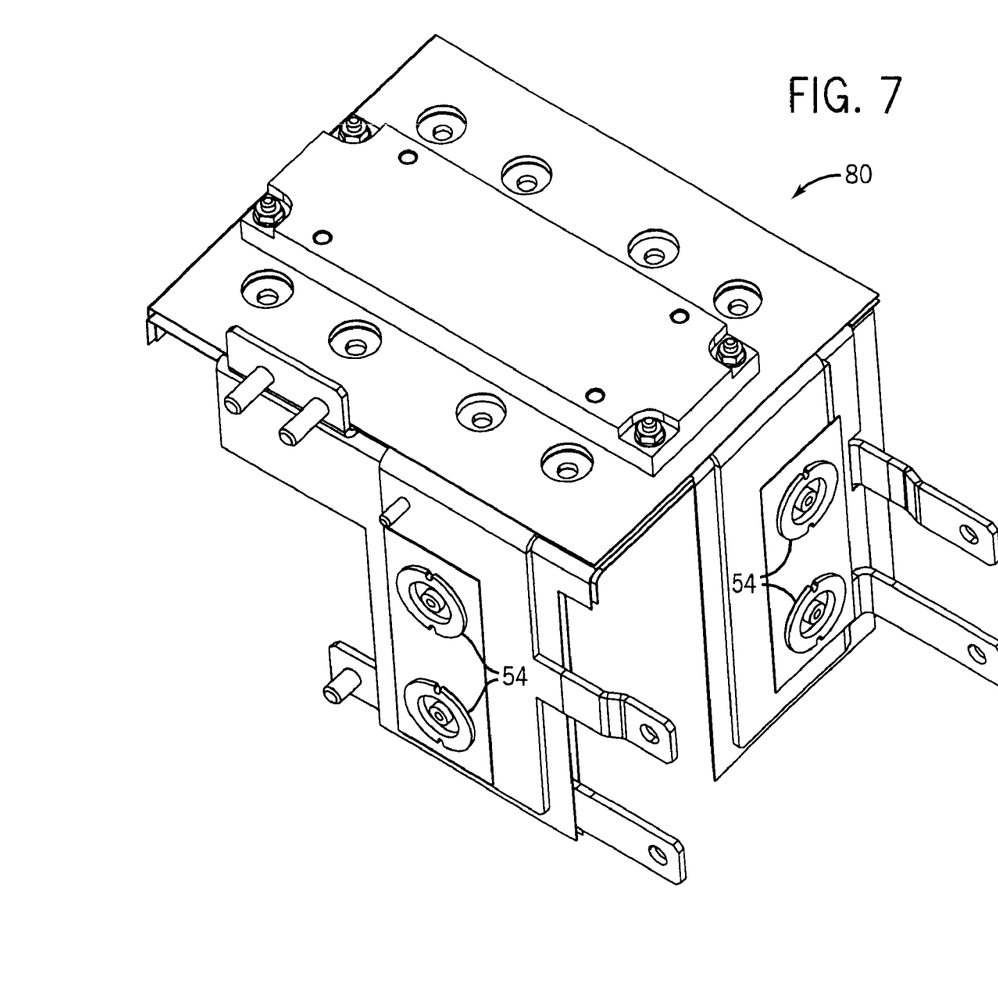
FIG. 7 is a perspective view of a multi-planar power bus assembled using the clamping fasteners of the present invention.

Referring now to FIG. 7, by utilizing the above-described clamping fasteners 54, it is possible to create power bus systems 80 that extend in multiple planes. That is, while a power bus 80 that includes portions extending beyond a single plane would be cost prohibitive to manufacture efficiently using adhesives, using the clamping fastners 54 of the present invention, such bus architectures are affordable. For example, such bus designs can be cut by common metal fabrication facilities, as opposed to a manufacturer specializing in bus design, and then assembled using the clamping fasteners 54 of the present invention, without the need for the highly skilled assembly processes of specialized bus manufacturers. Accordingly, a power bus may be designed to have virtually any geometry without substantial increases in manufacturing costs.

Therefore, the present invention provides a system and method for creating a power bus that reduces manufacturing costs and complexities, is more adaptable to various bus designs, and provides increased structural integrity. In particular, the present invention provides a system and method for creating a power bus that utilizes a plurality of clamping fasteners designed to secure the multiple layers of the power bus together without the need for adhesives. The clamping fasteners are self-fixing so minimal manufacturing skill is required to assemble a given power bus.

Additionally, the clamping fasteners are specifically designed to withstand the heating and vibrations often associated with the operational environments of many power busses. Accordingly, the present invention provides a significant improvement over traditional power bus assembly systems that rely on adhesives, which are known to be susceptible to such environmental influences over time.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A power bus assembly comprising:
   a first conductive sheet having a plurality of connection points and configured to receive a positive charge and distribute the positive charge to the plurality of connection points;
   a second conductive sheet having a plurality of connection points and configured to receive a negative charge and distribute the negative charge to the plurality of connection points;
   an insulating sheet arranged between the first conductive sheet and the second conductive sheet to electrically isolate the first conductive sheet from the second conductive sheet; and
   a plurality of vice fasteners securing the first conductive sheet, the second conductive sheet, and the insulating sheet together to form a power bus assembly, wherein each vice fastener includes at least two connected clamping plates, which each include a flange extending over a side of the power bus assembly proximate a conductive sheet and are positioned on opposite sides of the power bus assembly to compress the power bus assembly together.

2. The power bus assembly of claim 1 further comprising a plurality of holes formed in the first conductive sheet, the second conductive sheet, and the insulating sheet that are coaxially aligned to form through holes arranged in the power bus assembly.

3. The power bus assembly of claim 2 wherein each vice fastener includes:
   a first clamping plate arranged within one of the through holes formed in the power bus assembly and including a flange axially offset from the first clamping plate and extending radially from the first clamping plate to extend over a portion of a first side of the power bus assembly proximate to the first conductive sheet;
   a second clamping plate arranged within the one of the through holes formed in the power bus assembly and including a flange axially offset from the second clamping plate and extending radially from the second clamping plate to extend over a portion of a second side of the power bus assembly proximate to the second conductive sheet;
   a hub extending from the second clamping plate toward the first clamping plate through the one of the through holes formed in the power bus assembly; and
   a connector extending through the hub to engage the first clamping plate and the second clamping plate and compress the first side and the second side of the power bus assembly together.

4. The power bus assembly of claim 3 wherein the first clamping plate, the second clamping plate and the hub are formed of a non-conductive material.

5. The power bus assembly of claim 3 wherein the first clamping plate includes an annular notch formed opposite the flange to receive an end of the hub opposite the second clamping plate to restrict movement of the first clamping plate with respect to the second clamping plate.

6. The power bus assembly of claim 3 wherein the connector includes a threaded shaft configured to pass through a hole formed in the first clamping plate and aligned coaxially with the through hole in the power bus to engage the hub extending from the second clamping plate toward the first clamping plate.

7. The power bus assembly of claim 1 further comprising a plurality of conductive sheets and insulating sheets extending away from a plane formed by the first conductive sheet and the second conductive sheet to form a power bus assembly extending in multiple planes, wherein each plane of the power bus assembly includes a plurality of vice connectors compressing the plane together.

8. The power bus assembly of claim 1 further comprising a third conductive sheet forming a serial layer extending over at least a portion of at least one of the first conductive sheet and the second conductive sheet and at least partially separated from the first conductive sheet and the second conductive sheet by another insulating sheet having holes formed therein to provide electrical connections to one of the first conductive sheet and the second conductive sheet about the connection points.

9. The power bus assembly of claim 1 further comprising at least two input mounting studs and two output mounting studs extending from the first conductive sheet and the second conductive sheet configured to receive a rectifier and an inverter.

10. The power bus assembly of claim 9 further comprising a cover layer extending over at least one of the first conductive sheet and the second conductive sheet and held thereto by the plurality of vice fasteners to fortify the power bus assembly to support the rectifier and the inverter thereon when mounted to the input mounting studs and the output mounting studs.

11. The power bus assembly of claim 10 wherein the cover layer includes a grounding tab configured to ground the cover layer to form an electromagnetic shield over the power bus assembly.

12. The power bus assembly of claim 10 wherein the power bus assembly forms a DC bus link configured to receive DC power from the rectifier and deliver the DC power to the inverter to condition the DC power for delivery to a motor.

13. A power bus assembly comprising:
   a first conductive sheet having a plurality of connection points and a plurality of through holes formed therein, the first conductive sheet configured to receive a positive charge and distribute the positive charge to the plurality of connection points;
   a second conductive sheet having a plurality of connection points and a plurality of through holes formed therein, the second conductive sheet configured to receive a negative charge and distribute the negative charge to the plurality of connection points;
   an insulating sheet arranged between the first conductive sheet and the second conductive sheet to electrically isolate the first conductive sheet from the second conductive sheet and having a plurality of through holes arranged therein to align with the through holes formed in the first conductive sheet and the second conductive sheet to form a plurality of through hole sets that extend through the first conductive sheet, the second conductive sheet, and the insulating sheet; and a plurality of coupling fasteners, each coupling fastener aligned to extend through a through hole set and secure the first conductive sheet, the second conductive sheet, and the insulating sheet together to form a power bus assembly, wherein each coupling fastener includes at least two connected clamping plates having a flange that extends over a side of the power bus assembly proximate a conductive sheet.

14. The power bus assembly of claim 13 wherein each coupling fastener includes:

a first clamping plate arranged within one end of the hole set formed in the power bus assembly and including a flange axially offset from the first clamping plate and extending radially from the first clamping plate to extend over a portion of a first side of the power bus assembly proximate to the first conductive sheet;

a second clamping plate arranged within another end of the hole set formed in the power bus assembly and including a flange axially offset from the second clamping plate and extending radially from the second clamping plate to extend over a portion of a second side of the power bus assembly proximate to the second conductive sheet;

a hub extending from the second clamping plate toward the first clamping plate through the hole set formed in the power bus assembly; and a connector extending through the hub to engage the first clamping plate and the second clamping plate and compress the first side and the second side of the power bus assembly together.

15. The power bus assembly of claim 14 wherein the connector includes a threaded shaft configured to pass through a passage formed in the first clamping plate and aligned coaxially with the hole set in the power bus assembly to engage the hub extending from the second clamping plate toward the first clamping plate.

16. The power bus assembly of claim 15 wherein the hub includes a passage aligned coaxially with the through hole set and the passage formed in the first clamping plate and wherein a diameter of the passage is less than a diameter of the threaded shaft and, wherein that the threaded shaft is caused to bore into the hub as the threaded shaft is extended through the passage extending therethrough.

17. A method of manufacturing a power bus assembly comprising:

forming a first conductive sheet configured to receive a positive charge and distribute the positive charge to a plurality of connection points arranged thereon;

forming a second conductive sheet configured to receive a negative charge and distribute the negative charge to a plurality of connection points arranged thereon;

forming an insulating sheet having a perimeter substantially matched to perimeters of the first conductive sheet and the second conductive sheet;

cutting a plurality of through holes in the first conductive sheet, the second conductive sheet, and the insulating sheet;

arranging the insulating sheet between the first conductive sheet and the second conductive sheet to form a power bus assembly with the through holes formed in the first conductive sheet, the second conductive sheet, and the insulating sheet aligned to form a plurality of passages through the power bus assembly; and affixing a clamping fastener, which includes at least two connected clamping plates having a flange that extends over a side of the cower bus assembly proximate a conductive sheet, within each of the plurality of passages to secure the first conductive sheet, the second conductive sheet, and the insulating sheet together in the power bus assembly.

18. The method of claim 17 wherein the step of affixing the clamping fastener includes:

arranging a first clamping plate within a through hole such that a flange axially offset from the first clamping plate extends radially from the first clamping plate over a portion of the first conductive sheet surrounding the through hole;

arranging a second clamping plate within the through hole such that a flange axially offset from the second clamping plate extends radially from the second clamping plate over a portion of the second conductive sheet surrounding the through hole;

engaging a hub extending from the second clamping plate toward the first clamping plate through the through hole within a notch formed in the first clamping plate; and extending a connector through the hub to engage the first clamping plate and the second clamping plate and compress the first conductive sheet, the second conductive sheet, and the insulating sheet together in the power bus assembly.

19. The method of claim 18 wherein the step of extending the connector through the hub includes screwing a threaded shaft through a hole formed in the first clamping plate into an un-threaded passage formed in the hub to engage a head formed at one end of the threaded shaft with the first clamping plate.

20. A clamping fastener for creating an adhesive-less power bus assembly comprising:

a first clamping plate configured to be arranged within a through hole formed in a power bus assembly and including a flange axially offset from the first clamping plate and extending radially from the first clamping plate to extend over a portion of a first side of the power bus assembly;

a second clamping plate configured to be arranged within the through hole in the power bus assembly and including a flange axially offset from the second clamping plate and extending radially from the second clamping plate to extend over a portion of a second side of the power bus assembly arranged opposite the first side of the power bus assembly;

a hub extending from the second clamping plate toward the first clamping plate through the through hole in the power bus assembly; and a connector extending through the hub to engage the first clamping plate and the second clamping plate and compress the first side and the second side of the power bus assembly together.

21. The clamping fastener of claim 20 wherein the first clamping plate includes an annular notch formed opposite the flange to receive an end of the hub opposite the second clamping plate to restrict movement of the first clamping plate with respect to the second clamping plate.

22. The clamping fastener of claim 20 wherein the connector includes a threaded shaft configured to pass through a hole formed in the first clamping plate and aligned coaxially with the through hole in the power bus assembly to engage the hub extending from the second clamping plate toward the first clamping plate.

23. The clamping fastener of claim 22 wherein the hub includes a hole aligned coaxially with the through hole and the hole formed in the first clamping plate and wherein a diameter of the hole is less than a diameter of the threaded shaft, such that the threaded shaft is caused to bore into the hub as the threaded shaft is extended through the hub.

24. The clamping fastener of claim 22 wherein the first clamping plate, the second clamping plate, and the hub are formed of a non-conductive material.

* * * * *

UNITED STATES PATENT AND TRADEMARK OFFICE
CERTIFICATE OF CORRECTION

| | |
|---|---|
| PATENT NO. | : 7,709,737 B2 |
| APPLICATION NO. | : 11/460399 |
| DATED | : May 4, 2010 |
| INVENTOR(S) | : Jeremy J Keegan et al. |

It is certified that error appears in the above-identified patent and that said Letters Patent is hereby corrected as shown below:

Column 2, line 44, "Et" should be --a--.

Column 10, Claim 17, line 5, "cower" should be --power--.

Signed and Sealed this

Eighth Day of June, 2010

David J. Kappos
*Director of the United States Patent and Trademark Office*